(12) United States Patent
Oh et al.

(10) Patent No.: US 9,621,396 B2
(45) Date of Patent: Apr. 11, 2017

(54) TRANSMITTER, RECEIVER, AND CONTROLLING METHODS THEREOF

(71) Applicant: SAMSUNG ELECTRONICS CO., LTD., Suwon-si (KR)

(72) Inventors: Young-ho Oh, Suwon-si (KR); Sung-ryul Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/448,106

(22) Filed: Jul. 31, 2014

(65) Prior Publication Data

US 2015/0036764 A1 Feb. 5, 2015

Related U.S. Application Data

(60) Provisional application No. 61/862,215, filed on Aug. 5, 2013.

(30) Foreign Application Priority Data

Dec. 30, 2013 (KR) ........................ 10-2013-0166444

(51) Int. Cl.
  *H03D 3/22* (2006.01)
  *H04L 27/22* (2006.01)
  *H04L 27/26* (2006.01)

(52) U.S. Cl.
  CPC ...... *H04L 27/2692* (2013.01); *H04L 27/2613* (2013.01); *H04L 27/2657* (2013.01); *H04L 27/2662* (2013.01)

(58) Field of Classification Search
  CPC ... H04W 72/042; H04L 5/0053; H04L 5/0048
  See application file for complete search history.

(56) References Cited

U.S. PATENT DOCUMENTS 6,532,271 B1 * 3/2003 Hwang ............... H04L 27/2278
342/100
2004/0005022 A1 * 1/2004 Zhu et al. ..................... 375/365
(Continued)

FOREIGN PATENT DOCUMENTS

WO 2012/115453 A1 8/2012

OTHER PUBLICATIONS

Communication dated Nov. 25, 2014 issued by the Int. Searching Authority in counterpart Application No. PCT/KR2014/007184 (PCT/ISA/210).

(Continued)

*Primary Examiner* — Shuwang Liu
*Assistant Examiner* — Gina Mckie
(74) *Attorney, Agent, or Firm* — Sughrue Mion, PLLC

(57) ABSTRACT

A transmitter and receiver of a broadcast signal and corresponding methods are provided. The transmitter includes: a preamble symbol inserter configured to insert a preamble symbol including a synchronization part and an information part into a frame; and a transmitting unit configured to transmit the frame including the preamble symbol. The synchronization part includes a plurality of first sequences for measuring frequency offset of the preamble symbol, and the information part includes a plurality of second sequences for measuring a phase shift amount of the information part.

18 Claims, 11 Drawing Sheets

(56) References Cited

U.S. PATENT DOCUMENTS

| | | | |
|---|---|---|---|
| 2006/0120267 A1* | 6/2006 | De Bart | H04L 25/0236 370/208 |
| 2007/0002937 A1* | 1/2007 | Min et al. | 375/150 |
| 2008/0101508 A1* | 5/2008 | Oh | H04L 27/0014 375/344 |
| 2008/0220790 A1* | 9/2008 | Cai | H04W 40/12 455/450 |
| 2009/0225822 A1 | 9/2009 | Tupala et al. | |
| 2011/0013729 A1 | 1/2011 | Yuba et al. | |
| 2011/0099445 A1 | 4/2011 | Goto et al. | |
| 2012/0230453 A1 | 9/2012 | Shih et al. | |
| 2013/0195070 A1* | 8/2013 | Bashar | H04W 72/0493 370/330 |
| 2014/0198875 A1* | 7/2014 | Kim | H04H 20/59 375/295 |

OTHER PUBLICATIONS

Communication dated Nov. 25, 2014 issued by the Int. Searching Authority in counterpart Application No. PCT/KR2014/007184 (PCT/ISA/237).

* cited by examiner

TRANSMITTER, RECEIVER, AND CONTROLLING METHODS THEREOF

CROSS-REFERENCE TO RELATED APPLICATIONS

This application claims priority under 35 U.S.C. §119 from U.S. Provisional Application No. 61/862,215, filed on Aug. 5, 2013, in the United States Patent and Trademark Office, and Korean Patent Application No. 10-2013-0166444, filed on Dec. 30, 2013, in the Korean Intellectual Property Office, the disclosures of which are incorporated herein by reference in their entirety.

BACKGROUND

1. Field

Apparatuses and methods consistent with exemplary embodiments of the inventive concept relate to a transmitter that uses an orthogonal frequency division multiplexing (OFDM) method, a receiver, and controlling methods thereof.

2. Description of the Related Art

Digital Video Broadcasting the Second Generation Terrestrial (DVB-T2) is a $2^{nd}$ generation Europe terrestrial digital broadcasting standard that has been adopted in 35 or more nations of the whole world including Europe and has improved performance of DVB-T. The DVB-T2 applies the newest technologies, such as a low density parity check (LDPC) code, 256 quadrature amplitude modulation (QAM) method, etc., to realize increase in transmission capacity and high bandwidth efficiency. Therefore, the DVB-T2 may provide various types of high-quality services such as a high definition television (HDTV), etc. in a restricted band.

A T2-frame currently used in the DVB-T2 includes a preamble symbol P1, a preamble symbol P2, and a data symbol. The preamble symbol P1 is used to perform synchronization and transmit signaling data. A receiver detects the preamble symbol P1, performs synchronization by using the detected preamble symbol P1, compensates for frequency offset, and receives the signaling data.

However, a process of detecting the preamble symbol P1 is performed by using a guard interval of the preamble symbol P1. If the process of detecting the preamble symbol P1 is performed based on data, it is difficult to accurately detect a preamble start point within one (1) sample.

Therefore, there has been developed a method of using Zadoff-Chu sequences to accurately detect a preamble start point within one (1) sample.

FIG. 1 is a view illustrating a related art. In detail, a sync signal includes eight Zadoff-Chu sequences 110, and five of the eight Zadoff-Chu sequences 110 are used to transmit the sync signal. Therefore, data is loaded into only three sequences 120 to be transmitted.

A receiver stores several sequences and detects a preamble symbol based on outputs that are respectively correlated to received Zadoff-Chu sequences. Therefore, a structure of the receiver is complicated, and it is difficult to transmit a large amount of data.

Therefore, an information transmission amount in a preamble symbol is required to be increased, a preamble detection performance of a receiver is required to be improved, and complexity of a structure of the receiver is required to be reduced.

SUMMARY

Exemplary embodiments address at least the above problems and/or disadvantages and other disadvantages not described above. Also, the exemplary embodiments are not required to overcome the disadvantages described above, and may not overcome any of the problems described above.

The exemplary embodiments provide a transmitter that uses a preamble symbol including a plurality of the same sequences, a receiver, and controlling methods thereof.

According to an aspect of an exemplary embodiment, there is provided a transmitter which may include: a preamble symbol inserter configured to insert a preamble symbol including a synchronization part and an information part into a frame; and a transmitting unit configured to transmit the frame including preamble symbol. The synchronization part may include a plurality of first sequences for measuring frequency offset of the preamble symbol, and the information part may include a plurality of second sequences for measuring a phase shift amount of the information part.

The plurality of first sequences may be the same sequences, signals of the phase shift amount of the information part may be mapped on the plurality of second sequences, respectively, and the signals of the phase shift amount mapped on each of the plurality of second sequences are signals regarding a phase shift amount between two adjacent second sequences of the plurality of second sequences.

The signals of the phase shift amount of the information part may be signals that are modulated by using a Differential Binary Phase Shift Keying (DBPSK) method.

The plurality of first sequences and the plurality of second sequences may be Zadoff-Chu sequences.

The plurality of first sequences and the plurality of second sequences may be sequences that are acquired by multiplying a Zadoff-Chu sequence by a phase value of 0° or a phase value of 180°.

According to an aspect of another exemplary embodiment, there is provided a receiver which may include: a receiving unit configured to receive a frame including a preamble symbol including a synchronization part and an information part; and a preamble symbol detector configured to detect the preamble symbol based on a plurality of consecutive sequences of the synchronization part and the information part, measure frequency offset of the preamble symbol based on a plurality of first sequences included in the synchronization part, and measure a phase shift amount of the information part based on a plurality of second sequences included in the information part in order to detect signaling data of the preamble symbol based on the frequency offset and the phase shift amount.

The preamble symbol detector may sequentially delay the plurality of first sequences and the plurality of second sequences to continuously compare the plurality of first sequences and the plurality of second sequences in order to measure the frequency offset and the phase shift amount.

The preamble symbol detector may determine that the preamble symbol exists in a position corresponding to a largest value calculated by multiplying all of output values of a correlator of the receiver that are delayed in length units of the sequences in the frame.

The plurality of first sequences may be the same sequences, signals of the phase shift amount of the information part may be mapped on the plurality of second sequences, respectively, and the signals of the phase shift amount mapped on each of the plurality of second sequences are signals regarding a phase shift amount between two adjacent second sequences of the plurality of second sequences.

The signals of the phase shift amount of the information part may be signals that are modulated by a DBPSK method.

The plurality of first sequences and the plurality of second sequences may be Zadoff-Chu sequences.

The plurality of first sequences and the plurality of second sequences may be sequences that are acquired by multiplying a Zadoff-Chu sequence by a phase value of 0° or a phase value of 180°.

According to another aspect of the exemplary embodiments, there is provided a method of controlling a transmitter. The method may include: inserting a preamble symbol including a synchronization part and an information part into a frame; and transmitting the frame including the preamble symbol. The synchronization part may include a plurality of first sequences for measuring frequency offset, and the information part may include a plurality of second sequences for measuring a phase shift amount of the information part.

The plurality of first sequences may be the same sequences, signals of the phase shift amount of the information part may be mapped on the plurality of second sequences, respectively, and the signals of the phase shift amount mapped on each of the plurality of second sequences are signals regarding a phase shift amount between two adjacent second sequences of the plurality of second sequences.

The signals of the phase shift amount of the information part may be signals that are modulated by using a DBPSK method.

The plurality of first sequences and the plurality of second sequences may be Zadoff-Chu sequences.

The plurality of first sequences and the plurality of second sequences are sequences that may be acquired by multiplying a Zadoff-Chu sequence by a phase value of 0° or a phase value of 180°.

According to another aspect of the exemplary embodiments, there is provided a method of controlling a receiver. The method may include: receiving a frame including a preamble symbol including a synchronization part and an information part; detecting the preamble symbol based on a plurality of consecutive sequences of the synchronization part and the information part, measuring frequency offset based on a plurality of first sequences included in the synchronization part, and measuring a phase shift amount of the information part based on a plurality of second sequences included in the information part; and detecting signaling data of the preamble symbol based on the frequency offset and the phase shift amount.

The plurality of first sequences and the plurality of second sequences may be sequentially delayed to be continuously compared in order to measure the frequency offset and the phase shift amount.

The detecting of the preamble symbol may include: determining that the preamble symbol exists in a position corresponding to a largest value calculated by multiplying all of output values of a correlator that are delayed in length units of the sequences in the frame.

The plurality of first sequences may be the same sequences, signals of the phase shift amount of the information part may be mapped on the plurality of second sequences, respectively, and the signals of the phase shift amount mapped on each of the plurality of second sequences are signals regarding a phase shift amount between two adjacent second sequences of the plurality of second sequences.

The signals of the phase shift amount of the information part may be signals that are modulated by using a DBPSK method.

The plurality of first sequences and the plurality of second sequences may be Zadoff-Chu sequences.

The plurality of first sequences and the plurality of second sequences may be sequences that are acquired by multiplying a Zadoff-Chu sequence by a phase value of 0° or a phase value of 180°.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Figure 1:
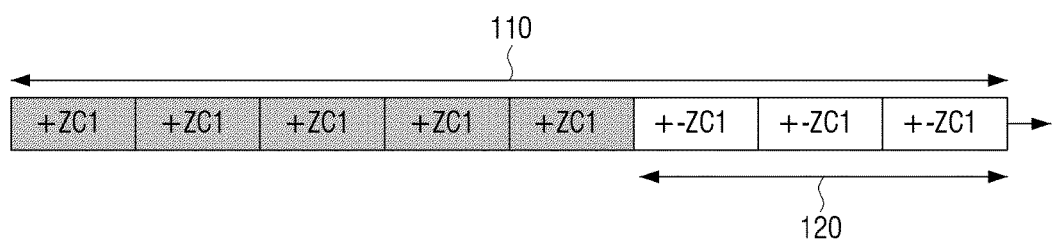
FIG. 1 is a view illustrating a related art.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

Figure 2:
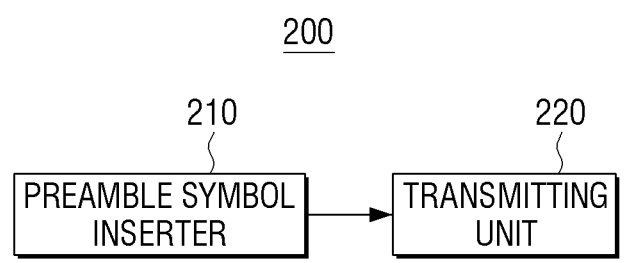
FIG. 2 is a block diagram illustrating a structure of a transmitter according to an exemplary embodiment of the inventive concept.

FIG. 2 is a block diagram illustrating a structure of a transmitter 200 according to an exemplary embodiment of the inventive concept.

Referring to FIG. 2, the transmitter 200 includes a preamble symbol inserter 210 and a transmitting unit 220.

Here, the preamble symbol inserter 210 may insert a preamble symbol, which includes a synchronization part and an information part, into a frame.

Also, the transmitting unit 220 may transmit the frame which includes the preamble symbol.

The preamble symbol may be used to notify a start point of the frame in order to match synchronization of the frame, and the transmitter 200 may transmit the frame according to the DVB-T2 method. Here, a unit for transmitting data by using the DVB-T2 method is referred to as a T2 frame.

Therefore, a T2 frame structure will now be described in detail.

Figure 3:
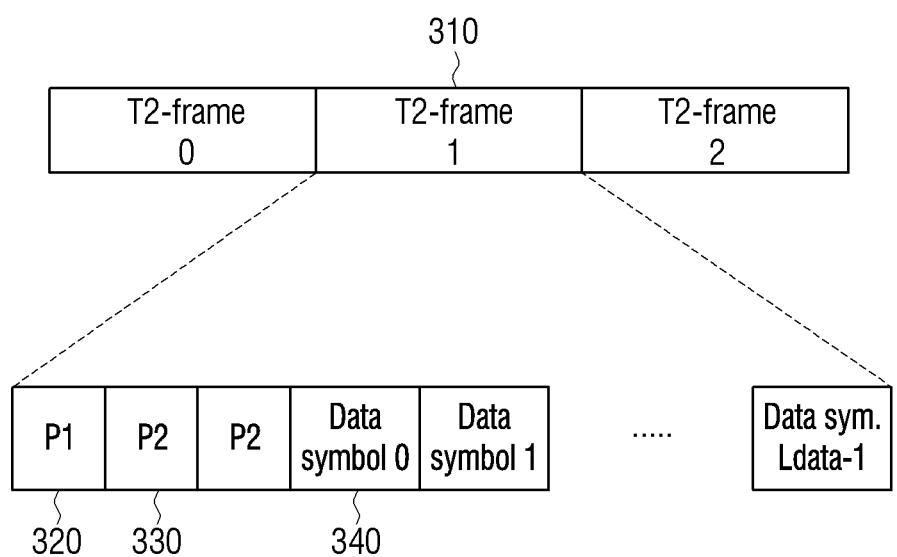
FIG. 3 is a view illustrating a T2 frame structure according to an exemplary embodiment of the inventive concept.

FIG. 3 is a view illustrating a T2 frame structure according to an exemplary embodiment of the inventive concept.

In FIG. 3, a plurality of T2 frames are illustrated in a time domain of DVB-T2. A T2 frame 310 may include a preamble symbol P1 320 that notifies a start point of the T2 frame 310, a preamble symbol P2 330 that transmits a first layer signal L1, and a data symbol 340 that transmits a broadcasting signal.

The preamble symbol P1 320 may be positioned in a first part of the T2 frame 310 and may be used to detect a start point of the T2 frame 310. Also, the preamble symbol P1 310 has a size of 1K Fast Fourier Transform (FFT) and is a guard interval type signal. The preamble symbol P1 320 in a frequency domain may use 384 of 853 subcarriers of 1K FFT and transmit 7-bit information.

Figure 4:
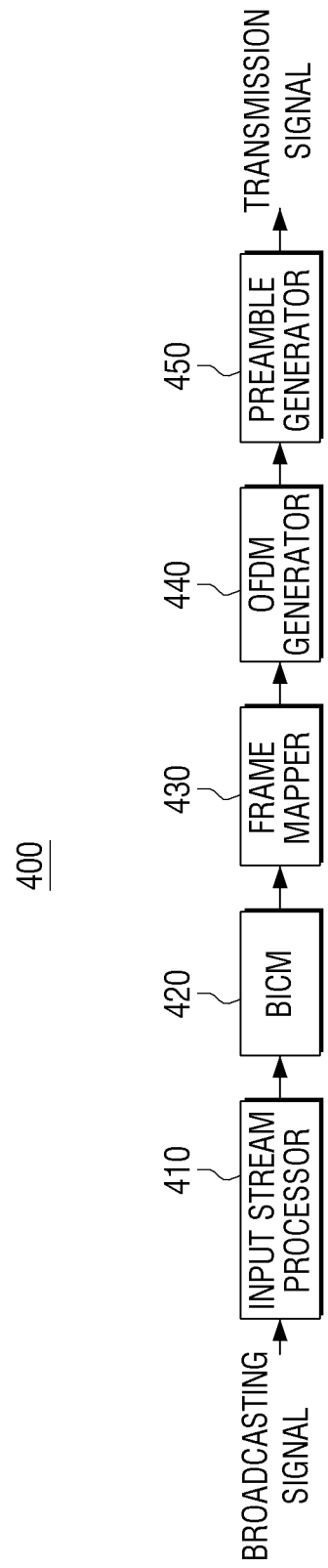
FIG. 4 is a view illustrating a transmitter that generates a T2 signal by using a Digital Video Broadcasting the Second Generation Terrestrial (DVB-T2) method, according to an exemplary embodiment of the inventive concept.

FIG. 4 is a block diagram illustrating a transmitter 400 that generates a T2 signal by using a DVB-T2 method, according to an exemplary embodiment of the inventive concept.

Referring to FIG. 4, the transmitter 400 that generates the T2 signal by using the DVB-T2 method includes an input stream processor 410, a Bit-Interleaved Coded Modulation (BICM) operator 420, a frame mapper 430, an orthogonal frequency division multiplexing (OFDM) generator 440, and a preamble generator 450.

The input stream processor 410 may process an input broadcasting signal to generate a baseband frame format signal from the input broadcasting signal.

The BICM operator 420 codes the input baseband frame format signal through a low density parity check (LDPC) code and modulate the coded signal.

Here, in the DVB-T2 method, there are LDPC codes respectively having a length of 64,800 bits and a length of 16,400 bits, and an input signal may be coded according to various code rates. The coded signal may be modulated by using Quadrature Phase Shift Keying (QPSK), 16 Quadrature Amplitude Modulation (QAM), 64 QAM, 256 QAM, or the like.

The frame mapper 430 may generate a T2 frame structure for OFDM transmission. Here, the T2 frame structure may include a data subcarrier for transmitting a signal into which a broadcasting signal is modulated, a pilot for estimating a channel, a subcarrier (or a reserved tone) for reducing a peak-to-average power ratio (PAPR), etc.

The OFDM generator 440 may convert a signal input from the frame mapper 430 into a time domain signal by using an Inverse FFT (IFFT) method of converting a frequency domain signal into a time domain signal.

The preamble generator 450 may add a preamble to a start part of a T2 frame for synchronization of the T2 frame in order to generate a transmission signal.

The preamble symbol inserter 210 illustrated in FIG. 2 according to the exemplary embodiment of the inventive concept may correspond to the preamble generator 450 of the transmitter 400 that uses the DVB-T2 method.

Referring to FIG. 2, the transmitter 200 may transmit the frame including the preamble symbol P1 as described above. Hereinafter, the preamble symbol P1 will be referred to as a preamble symbol.

Here, the preamble symbol may include a synchronization part and an information part.

The synchronization part may include a plurality of first sequences for measuring frequency offset of the preamble symbol, and the information part may include a plurality of second sequences for measuring a phase shift amount of the information part.

The synchronization part is used to measure frequency offset in order to accurately detect signaling data of the preamble symbol. If the frequency offset occurs, a Zadoff-Chu sequence appears with a time delay and a phase shift of an output value of a correlator of a receiver.

Here, the phase shift appears with a preset size value according to a position of a sequence. This will now be described in more detail.

Figure 6:
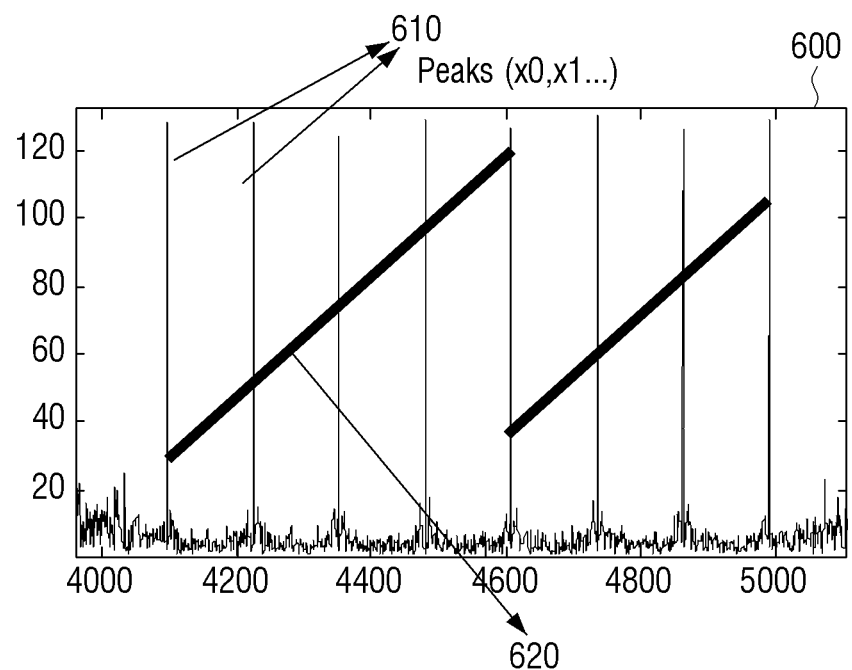
FIG. 6 is a graph illustrating phase shifts occurring due to an effect of frequency offset, according to an exemplary embodiment of the inventive concept.

FIG. 6 is a graph illustrating phase shifts occurring due to an effect of frequency offset, according to an exemplary embodiment of the inventive concept.

Referring to FIG. 6, a graph 600 where a horizontal axis denotes a frequency axis, and a vertical axis denotes a phase value is illustrated. The graph 600 includes a total of eight peaks 610, and a straight line 620 connecting phase values corresponding to each of the eight peaks 610 is illustrated. It can be seen that each of the peaks 610 has a different phase value due to an effect of frequency offset.

The phase values respectively corresponding to the peaks 610 are linearly shifted.

Therefore, a difference between a phase value affected by frequency offset of a second peak and a phase value affected by frequency offset of a first peak is equal to a difference between a phase value affected by frequency offset of a third peak and the phase value affected by the frequency offset of the second peak. For example, if there are a total of eight peak values x0, x1, x2, x3, x4, x5, x6, and x7, phase values respectively corresponding to the eight peak values x0, x1, x2, x3, x4, x5, x6, and x7 are z, 2*z, 3*z, 4*z, 5*z, 6*z, 7*z, and 8*z. This is because phase values respectively corresponding to peaks are linearly shifted or changed as described above.

Therefore, a difference between phase values respectively corresponding to the peak values x1 and x0 is z, a difference between phase values respectively corresponding to the peak values x2 and x1 is also z, and a difference between phase values respectively corresponding to the peak values x3 and x2 and a difference between phase values respectively corresponding to the peak values x4 and x3 are all z.

In other words, as described above, a difference between phase values respectively corresponding to two consecutive peaks is a difference between frequency offset values affecting phases of the two consecutive peaks. Here, differences between frequency offset values indicating differences between phase values of two consecutive peaks are all the same.

Therefore, if phase values of peaks, each two of which makes a pair, are summed, and then equally summed frequency offset values respectively affecting phases of each two peaks are subtracted from the summed phase values, phase shifts of peaks except an effect of frequency offset may be checked.

As a result, a receiver 700 may check frequency offset and a phase shift between adjacent sequences to calculate phase value differences between all sequences and detect signaling data from a preamble symbol based on the calculated phase value differences.

A structure of the preamble symbol for measuring the frequency offset and the phase shift between the adjacent sequences will now be described in detail.

As described above, a synchronization part included in the preamble symbol includes a plurality of first sequences for measuring frequency offset, and an information part included in the preamble symbol includes a plurality of second sequences for measuring a phase shift amount of the information part. Here, the plurality of first sequences are the same sequences, and signals of the phase shift amount of the information part are mapped on the plurality of second sequences, respectively.

The signals of the phase sift amount mapped on each of the plurality of second sequence are signals regarding a phase shift amount between two adjacent second sequences in the plurality of second sequences.

For example, since the plurality of first sequences are used to measure the frequency offset, the frequency offset may be measured based on only two first sequences.

Figure 5:
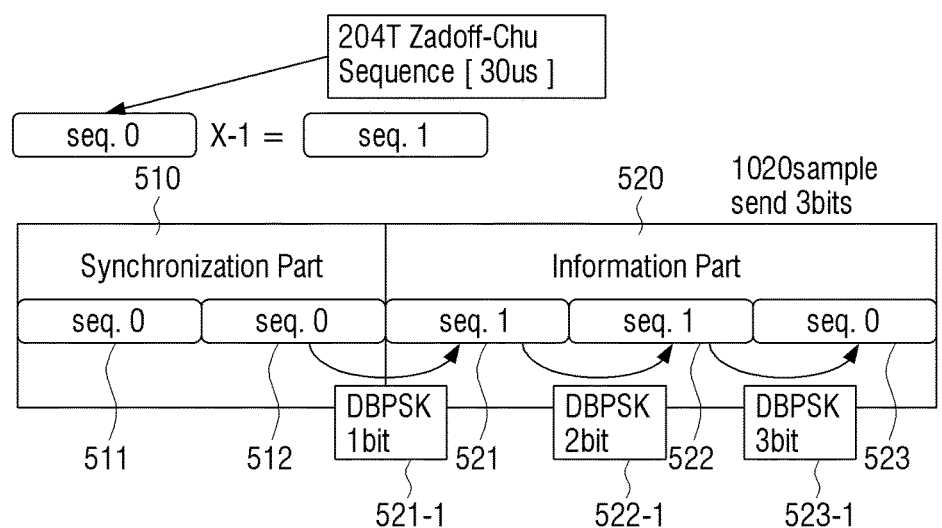
FIG. 5 is a view illustrating a structure of a preamble symbol according to an exemplary embodiment of the inventive concept.

FIG. 5 is a view illustrating a structure of a preamble symbol according to an exemplary embodiment of the inventive concept.

Referring to FIG. 5, the preamble symbol may include a synchronization part 510 and an information part 520.

The synchronization part 510 may include the two same sequences 511 and 512, and the information part 520 may include different sequences 521, 522, and 523 that are randomly mixed.

Here, the synchronization part 510 includes the same sequences 511 and 512 to measure frequency offset based on the same sequences 511 and 512. In other words, since the same sequences 511 and 512 have the same phase, different phases, if any, would have been caused due to frequency offset.

Signals of a phase shift amount of the information part are mapped on the plurality of different sequences 521, 522, and 523, respectively, included in the information part 520. Here, the signals of the phase shift amount mapped on each of the plurality of second sequences are signals regarding phase shift amount between two adjacent sequences in the plurality of different sequences 521, 522, and 523.

For example, if a sequence acquired by 180° shifting a phase of sequence 0 is assumed as sequence 1, a phase difference between the sequence 0 and the sequence 1 is 180°.

Therefore, since sequences 0 511 and 512 included in the synchronization part 510 should have the same phase, frequency offset may be measured based on a phase difference of the sequences 0 511 and 512.

Also, three sequences 521, 522, and 523 included in the information part 520 are sequence 1, sequence 1, and sequence 0. Therefore, the sequence 1 521 disposed in a first part of the information part 520 has a phase difference of 180° from the sequence 0 512 disposed in a second part of the synchronization part 510. Also, the sequence 1 522 disposed in a second part of the information part 520 has the same phase as the sequence 1 521 and thus has a phase difference of 0° from the sequence 1 521.

Sequence 0 523 disposed in a third part of the information part 520 has a phase difference of 180° from the sequence 0 522 disposed in the second part of the information part 520.

In other words, the phase shift amount of the information part 520 refers to a sum of phase shifts from immediately previous sequences in the plurality of sequences included in the information part 520.

Signals of the calculated phase shift amount of the information part 520 may be mapped on the plurality of sequences included in the information part 520, respectively.

In detail, the signal of the phase shift amount may be a signal that is modulated by using a Differential Binary Phase Shift Keying (DBPSK) method. Here, the DBPSK method refers to a phase modulation method of performing an OR operation on binary codes through a transmitter to shift the binary codes by two (2) phases. The DBPSK is standardized (IEEE 802.11) to be used as a baseband modulation method in a wireless local area network (WLAN), and directly used in a direct-sequence spread spectrum (DS-SS) method.

For example, if the transmitter shifts a binary code, which is acquired by performing an OR operation on codes to be transmitted, so that the binary code corresponds to an equiphase and an antiphase of a carrier, and transmits the shifted binary code, a receiver converts the binary code into a logical difference after a demodulation process to restore an original pulse.

Therefore, a phase shift amount between the sequence 1 521 disposed in the first part of the information part 520 and the sequence 0 512 disposed in the second part of the synchronization part 510 is binary-coded by the DBPSK method and then stored as DBPSK 1 bit 521-1 to be mapped on the sequence 1 521 disposed in the first part of the information part 520.

A phase shift amount between the sequence 1 522 disposed in the second part of the information part 520 and the previous sequence 1 521 is binary-coded by the DBPSK method and then stored as DBPSK 2 bit 522-1 to be mapped on the sequence 1 522 disposed in the second part of the information part 520.

A phase shift amount between the sequence 0 523 disposed in the third part of the information part 520 and the sequence 522 disposed in the second part of the information part 520 is binary-coded by the DBPSK method and then stored as DBPSK 3 bit 523-1 to be mapped on the sequence 0 523 disposed in the third part of the information part 520.

The information part 520 includes three sequences in FIG. 5, but this is only an example. Therefore, the information part 520 may include a larger number of sequences.

As described above, the preamble symbol inserter 210 inserts a preamble symbol including the synchronization part 510 and the information part 520 into a frame. Here, the same sequences 511 and 512 included in the synchronization part 510 are used to measure frequency offset, and the plurality of different sequences 521, 522, and 523 included in the information part 520 are used to measure a phase shift amount of the information part 520.

A process of detecting a phase of an original signal based on frequency offset and a phase shift amount will be described later.

A plurality of first sequences and a plurality of second sequences may be Zadoff-Chu sequences. Here, since the Zadoff-Chu sequences have constant envelops in time and frequency domains, the Zadoff-Chu sequences have high peak-to-average-power ratios (PAPRs) and show high channel estimation performances.

The Zadoff-Chu sequences have circular autocorrelations of 0 with respect to a non-zero shift. Therefore, terminal apparatuses that transmit control information by using the same Zadoff-Chu sequence may have different cyclic shift values of the Zadoff-Chu sequence to be distinguished from one another.

In other words, if the Zadoff-Chu sequences are the same as or different from one another, the Zadoff-Chu sequences may be used to differently calculate a correlation value.

Therefore, Zadoff-Chu sequences may be inserted into a preamble symbol according to an exemplary embodiment of the inventive concept. As a result, the two same Zadoff-Chu sequences 511 and 512 included in the synchronization part 510 may be used to measure frequency offset, and the plurality of Zadoff-Chu sequences 521, 522, and 523 included in the information part 520 may be used to measure a phase shift based on a correlation between adjacent Zadoff-Chu sequences.

According to an exemplary embodiment of the inventive concept, a plurality of first sequences and a plurality of second sequences may be acquired by multiplying the same Zadoff-Chu sequence by a phase value of 0° or a phase value 180°.

Figure 7:
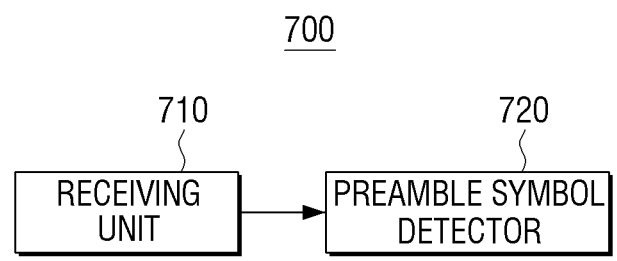
FIG. 7 is a block diagram illustrating a structure of a receiver according to an exemplary embodiment of the inventive concept.

FIG. 7 is a block diagram illustrating a structure of the receiver 700, according to an exemplary embodiment of the inventive concept.

Referring to FIG. 7, the receiver 700 includes a receiving unit 710 and a preamble symbol detector 720.

The receiver 700 may be a broadcasting signal receiver to which the DVB-T2 method is applied. The broadcasting signal receiver to which the DVB-T2 method is applied may include a preamble detector (not shown), an OFDM demodulator (not shown), a frame demapper (not shown), a BICM decoder (not shown), and a stream generator (not shown).

The above-mentioned elements will now be respectively described in brief. Preamble symbols are transmitted from a plurality of antennas by using an OFDM method. Here, the preamble detector may differentiate the preamble symbols, which are transmitted to the plurality of antennas, from one another.

The OFDM demodulator may perform OFDM demodulation, and the frame demapper may generate a coded signal that is to be received.

Also, the BICM decoder may decode the received coded signal, and the stream generator may generate a broadcasting signal based on the decoded signal.

Here, the preamble symbol detector 720 according to the present exemplary embodiment may be applied to the preamble detector (not shown) of the broadcasting signal receiver to which the DVB-T2 is applied.

The receiving unit 710 may receive a frame including a preamble symbol including a synchronization part and an information part.

The preamble symbol detector 720 may delay a plurality of sequences included in the synchronization part and the information part in length units of the respective sequences within the frame, and determine whether the preamble symbol exists in a position corresponding to a largest value calculated by multiplying all of output values of a correlator in the receiver 700.

The preamble symbol detector 720 may measure frequency offset based on a plurality of first sequences included in the synchronization part and measure a phase shift amount of the information part based on a plurality of second sequences to detect signaling data of the preamble symbol based on the frequency offset and the phase shift amount.

As shown in FIG. 5, the preamble symbol detector 720 may measure the frequency offset based on the two same sequences 511 and 512 included in the synchronization part 510 of the received preamble symbol.

In other words, since the two same sequences 511 and 512 should have the same phase, the preamble symbol detector 720 may measure the frequency offset based on a phase difference between the two same sequences 511 and 512.

Also, the preamble symbol detector 720 may measure the phase shift amount of the information part 520 based on the plurality of sequences 521, 522, and 523 included in the information part 520 of the received preamble symbol.

Here, the preamble symbol detector 720 may measure a phase shift of the information part 520 based on signals of the phase shift amounts of the information part 520 that are mapped on the plurality of sequences 521, 522, and 523, respectively.

The preamble symbol detector 720 may measure the signaling data of the preamble symbol based on the measured frequency offset and phase shift amount. This will be described in detail later.

In detail, the preamble symbol detector 720 may sequentially delay a plurality of first sequences and a plurality of second sequences to continuously compare the plurality of sequences in order to measure the frequency offset and the phase shift amount. A method of sequentially delaying and continuously comparing the plurality of sequences to measure frequency offset and phase shift amounts will now be described in detail with reference to FIG. 8.

Figure 8:
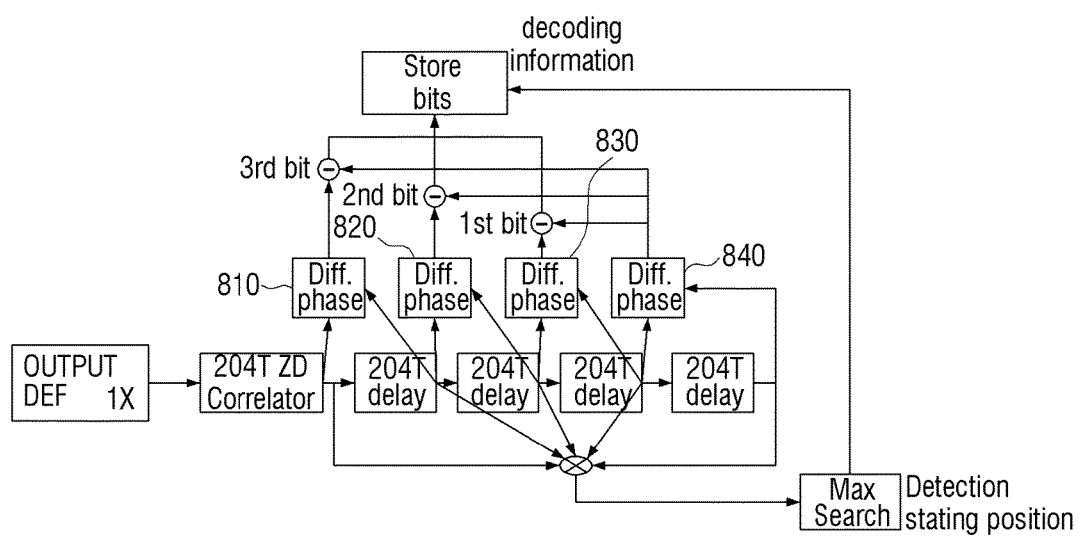
FIG. 8 is a view illustrating a detailed structure of a receiver, according to an exemplary embodiment of the inventive concept.

FIG. 8 is a view illustrating a detailed structure of the receiver 700, according to an exemplary embodiment of the inventive concept.

Referring to FIG. 8, the preamble symbol detector 720 may include a Zadoff-Chu sequence correlator and a detector that delays an output of the Zadoff-Chu sequence correlator in a length unit of a sequence to detect a phase shift.

Here, the receiving unit 710 may receive a preamble symbol including five Zadoff-Chu sequences 511, 512, 521, 522, and 523 shown in FIG. 5, and the preamble symbol detector 720 may detect frequency offset 840 based on two Zadoff-Chu sequences 511 and 512 included in the synchronization part 510 of the received preamble symbol.

The preamble symbol detector 720 may also sequentially delay the received five Zadoff-Chu sequences 511, 512, 521, 522, and 523, to delay outputs of the Zadoff-Chu sequence correlator, from the Zadoff-Chu sequence 523 disposed in a rightmost part of the information part 520.

The preamble symbol detector 720 may correlate the received five Zadoff-Chu sequences 511, 512, 521, 522, and 523 with at least one Zadoff-Chu sequence stored in the receiver 700 and sequentially delay the received five Zadoff-Chu sequences 511, 512, 521, 522, and 523 to detect phase shifts 810, 820, and 830 between adjacent Zadoff-Chu sequences. Here, a sum of the detected phase shifts 810, 820, and 830 between the adjacent Zadoff-Chu sequences refers to a phase shift of the information part 520.

The preamble symbol detector 720 may subtract detected frequency offset 840 from the phase shifts 810, 820, and 830 between the adjacent Zadoff-Chu sequences that are detected by sequentially delaying the adjacent Zadoff-Chu sequences at a time and then store the subtraction result.

The preamble symbol detector 720 may detect a preamble symbol based on a plurality of consecutive sequences of a synchronization part and an information part.

In detail, the preamble symbol detector 720 may determine that the preamble symbol exists in a position corresponding to a largest value calculated by multiplying all of output values of a correlator of consecutive Zadoff-Chu sequences delayed in length units of the Zadoff-Chu sequences by using a characteristic in which peaks constantly occur in the output values of the correlator in length units of the Zadoff-Chu sequences.

FIG. 8 illustrates four modules that delay a preamble symbol including five Zadoff-Chu sequences to measure a phase shift as shown in FIG. 5, but the inventive concept is not limited thereto. The number of modules, which delay a preamble symbol including a larger number of Zadoff-Chu sequences to measure a phase shift, increases.

Figure 9:
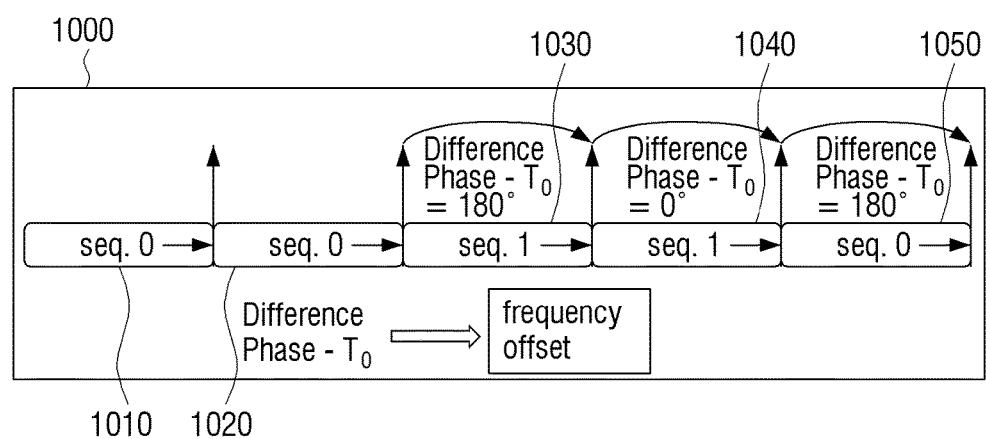
FIG. 9 is a view illustrating a method of detecting a preamble symbol according to an exemplary embodiment of the inventive concept.

FIG. 9 is a view illustrating a method of detecting a preamble symbol according to an exemplary embodiment of the inventive concept.

Referring to FIG. 9, the preamble symbol detector 720 may detect frequency offset based on the two same sequences 0 1010 and 1020 included in a received preamble symbol 1000.

The preamble symbol detector 720 may measure a phase shift amount based on a plurality of sequences 1030, 1040, and 1050, measure a phase shift of 180° between the sequence 0 1020 and the next sequence 1 1030, measure a phase shift of 0° between the sequence 1 1030 and the next sequence 1 1040, and measure a phase shift of 180° between the sequence 1 1040 and the next sequence 0 1050.

The preamble symbol detector 720 may also detect a preamble symbol based on a plurality of consecutive sequences of a synchronization part and an information part.

The preamble symbol detector 720 may measure frequency offset based only the two same sequences and reflect the measured frequency offset to accurately calculate a phase shift. Therefore, an occupied ratio of sequences for matching synchronization in a frame is reduced. As a result, a ratio for transmitting data may be increased, and thus a data transmission rate may be increased.

The receiver 700 may detect and restore all signals based only one sequence, and thus a structure of the receiver 700 may be simplified.

Figure 10:
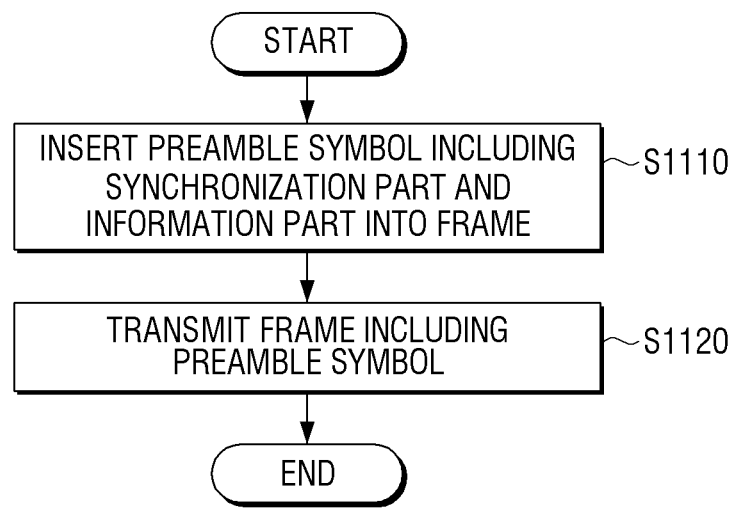
FIG. 10 is a flowchart illustrating a method of controlling a transmitter according to an exemplary embodiment of the inventive concept.

FIG. 10 is a flowchart illustrating a method of controlling a transmitter according to an exemplary embodiment of the inventive concept.

Referring to FIG. 10, in operation S1110, the transmitter inserts a preamble symbol including a synchronization part and an information part into a frame.

In operation S1120, the transmitter transmits the frame including the preamble symbol.

Here, the synchronization part may include a plurality of first sequences for measuring frequency offset, and the information part may include a plurality of second sequences for measuring a phase shift amount of the information part.

Also, the plurality of first sequences are the same sequences, signals of the phase shift amount of the information part may be mapped on the plurality of second sequences, respectively, and the signals of the phase shift amount mapped on each of the plurality of second sequences are signals regarding phase shift amount between two adjacent second sequences in the plurality of second sequences.

Here, the signal of the phase shift amount may be a signal that is modulated by using a DBPSK method.

Also, the plurality of first sequences and the plurality of second sequences may be Zadoff-Chu sequences.

Here, the plurality of first sequences and the plurality of second sequences may be sequences that are acquired by multiplying the same Zadoff-Chu sequence by a phase value of 0° or a phase value of 180°.

Figure 11:
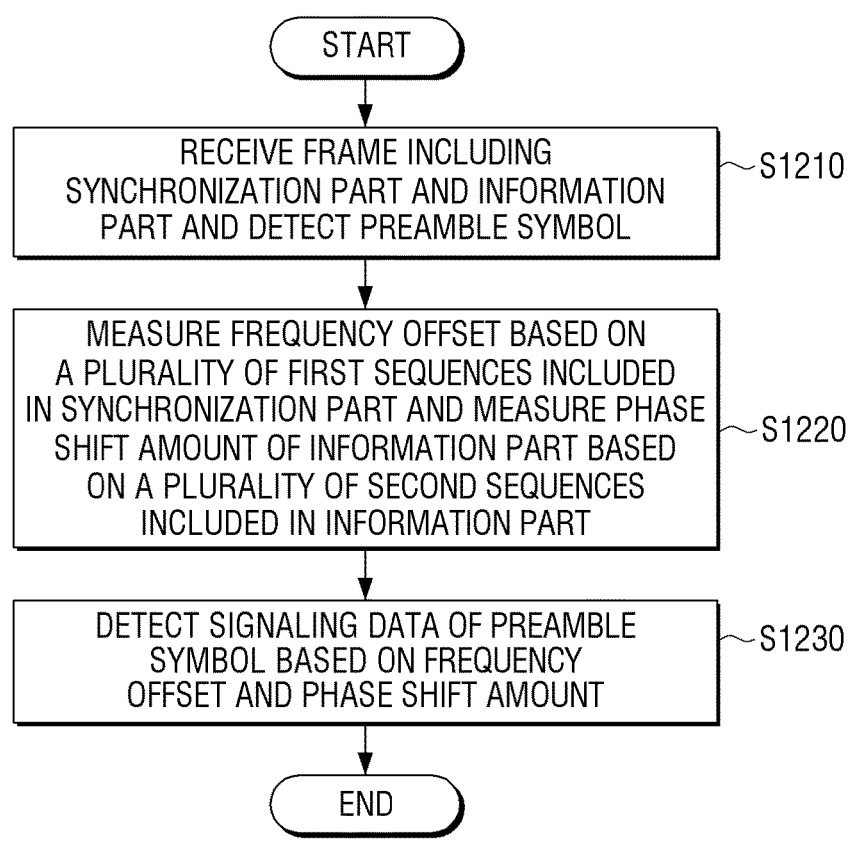
FIG. 11 is a flowchart illustrating a method of controlling a receiver according to an exemplary embodiment of the inventive concept.

FIG. 11 is a flowchart illustrating a method of controlling a receiver according to an exemplary embodiment of the inventive concept.

Referring to FIG. 11, in operation S1210, the receiver receives a frame including a preamble symbol including a synchronization part and an information part and detects the preamble symbol based on a plurality of consecutive sequences of the synchronization part and the information part.

In operation S1210, the transmitter may determine that the preamble symbol exists in a position corresponding to a largest value calculated by multiplying all of output values of a correlator that are delayed in length units of the sequences in the frame.

In operation S1220, the transmitter measures frequency offset based on a plurality of first sequences included in the synchronization part, and measures a phase shift amount of the information part based on a plurality of second sequences included in the information part.

In operation S1230, the transmitter detects signaling data of the preamble symbol based on the frequency offset and the phase shift amount.

Here, in operation S1220, the transmitter may sequentially delay and continuously compare the plurality of first sequences and the plurality of second sequences to measure the frequency offset and the phase shift amount.

The plurality of first sequences are the same sequences, signals of the phase shift amount of the information part are mapped on the plurality of second sequences, respectively, and the signals of the phase shift amount mapped on each of the plurality of second sequences are signals regarding phase shift amount between two adjacent second sequences in the plurality of second sequences.

Here, the signal of the phase shift amount is a signal that is modulated by using a DBPSK method.

The plurality of first sequences and the plurality of second sequences may be Zadoff-Chu sequences.

Here, the plurality of first sequences and the plurality of second sequences may be sequences that are acquired by multiplying the same Zadoff-Chu sequence by a phase value of 0° or a phase value of 180°.

According to various exemplary embodiments of the inventive concept as described above, a receiver may accurately detect a preamble symbol based on a plurality of the same sequences inserted into the preamble symbol. Also, complexity of a structure of the receiver may be reduced, and a data transmission rate may be increased.

There may be provided a non-transitory computer-readable medium that stores a program sequentially performing controlling methods according to the inventive concept.

For example, there may be provided a non-transitory computer-readable medium that stores a program performing: inserting a preamble symbol including a synchronization part and an information part into a frame; and transmitting the frame including the preamble symbol.

Also, there may be provided a non-transitory computer-readable medium that stores a program performing: receiving a frame including a preamble symbol including a synchronization part and an information part; measuring frequency offset based on a plurality of first sequences included in the synchronization part and measuring a phase shift amount of the information part based on a plurality of second sequences included in the information part; and detecting signaling data of the preamble symbol based on the frequency offset and the phase shift amount.

The non-transitory computer readable medium refers to a medium which does not store data for a short time such as a register, a cache memory, a memory, or the like but semi-permanently stores data and is readable by a device. In detail, the above-described applications or programs may be stored and provided on a non-transitory computer readable medium such as a CD, a DVD, a hard disk, a blue-ray disk, a universal serial bus (USB), a memory card, a ROM, or the like.

A bus is not shown in the above-described block diagrams illustrating a transmitter and a receiver. However, communications between elements of the transmitter and the receiver may be performed through the bus. Also, each component, unit or element represented by a block as illustrated in FIGS. 2, 4, 7 and 8 may be embodied as a various numbers of hardware, software and/or firmware structures that execute respective functions described above, and may further include a processor, such as a central processing unit (CPU), a microprocessor, or the like, performing the above-described various operations.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A transmitting apparatus comprising:
   a preamble symbol inserter configured to insert a preamble symbol comprising a synchronization part and an information part into a frame; and
   a transmitter configured to transmit the frame comprising the preamble symbol,
   wherein the synchronization part comprises a plurality of first sequences for measuring frequency offset of the preamble symbol, and the information part comprises a plurality of second sequences for measuring a phase shift amount of the information part,
   wherein the plurality of first sequences are the same sequences having a same phase, and
   wherein a phase shift amount between a second sequence and at least one second sequence adjacent to the second sequence is mapped on each of the plurality of second sequences.

2. The transmitting apparatus of claim 1, wherein the signals of the phase shift amount of the information part are signals that are modulated by using a Differential Binary Phase Shift Keying (DBPSK) method.

3. The transmitting apparatus of claim 1, wherein the plurality of first sequences and the plurality of second sequences are Zadoff-Chu sequences.

4. The transmitting apparatus of claim 3, wherein the plurality of first sequences and the plurality of second sequences are sequences that are acquired by multiplying a Zadoff-Chu sequence by a phase value of 0° or a phase value of 180°.

5. The transmitting apparatus of claim 1, wherein the frame further comprises another preamble symbol that transmits a first layer signal L1.

6. A receiving apparatus comprising:
   a receiver configured to receive a frame comprising a preamble symbol comprising a synchronization part and an information part; and
   a preamble symbol detector configured to detect the preamble symbol based on a plurality of consecutive sequences of the synchronization part and the information part,
   wherein the preamble symbol detector is further configured to measure frequency offset of the preamble symbol based on a plurality of first sequences included in the synchronization part, and measure a phase shift amount of the information part based on a plurality of second sequences included in the information part, and
   wherein the preamble symbol detector is further configured to detect signaling data of the preamble symbol based on the frequency offset and the phase shift amount,
   wherein the plurality of first sequences are the same sequences having a same phase, and
   wherein a phase shift amount between a second sequence and at least one second sequence adjacent to the second sequence is mapped on each of the plurality of second sequences.

7. The receiving apparatus of claim 6, wherein the preamble symbol detector sequentially delays the plurality of first sequences and the plurality of second sequences to continuously compare the plurality of first sequences and the plurality of second sequences in order to measure the frequency offset and the phase shift amount of the information part.

8. The receiving apparatus of claim 7, wherein the preamble symbol detector determines that the preamble symbol exists in a position corresponding to a largest value calculated by multiplying all of output values of a correlator of the receiver that are delayed in length units of the sequences in the frame.

9. The receiving apparatus of claim 6, wherein the signals of the phase shift amount of the information part are signals that are modulated by a Differential Binary Phase Shift Keying (DBPSK) method.

10. The receiving apparatus of claim 6, wherein the plurality of first sequences and the plurality of second sequences are Zadoff-Chu sequences.

11. The receiving apparatus of claim 10, wherein the plurality of first sequences and the plurality of second sequences are sequences that are acquired by multiplying a Zadoff-Chu sequence by a phase value of 0° or a phase value of 180°.

12. A method of controlling a transmitter, the method comprising:
   inserting a preamble symbol comprising a synchronization part and an information part into a frame; and
   transmitting the frame comprising the preamble symbol,
   wherein the synchronization part comprises a plurality of first sequences for measuring frequency offset of the preamble symbol, and the information part comprises a plurality of second sequences for measuring a phase shift amount of the information part,
   wherein the plurality of first sequences are the same sequences having a same phase, and
   wherein a phase shift amount between a second sequence and at least one second sequence adjacent to the second sequence is mapped on each of the plurality of second sequences.

13. The method of claim 12, wherein the signals of the phase shift amount of the information part are signals that are modulated by using a Differential Binary Phase Shift Keying (DBPSK) method.

14. The method of claim 12, wherein the plurality of first sequences and the plurality of second sequences are Zadoff-Chu sequences.

15. The method of claim 14, wherein the plurality of first sequences and the plurality of second sequences are sequences that are acquired by multiplying a Zadoff-Chu sequence by a phase value of 0° or a phase value of 180°.

16. A method of controlling a receiver, the method comprising:

receiving a frame comprising a preamble symbol comprising a synchronization part and an information part;

detecting the preamble symbol based on a plurality of consecutive sequences of the synchronization part and the information part, measuring frequency offset of the preamble symbol based on a plurality of first sequences included in the synchronization part, and measuring a phase shift amount of the information part based on a plurality of second sequences included in the information part; and detecting signaling data of the preamble symbol based on the frequency offset and the phase shift amount, wherein the plurality of first sequences are the same sequences having a same phase, and wherein a phase shift amount between a second sequence and at least one second sequence adjacent to the second sequence is mapped on each of the plurality of second sequences.

17. The method of claim 16, wherein the plurality of first sequences and the plurality of second sequences are sequentially delayed to be continuously compared in order to measure the frequency offset and the phase shift amount of the information part.

18. The method of claim 17, wherein the detecting of the preamble symbol comprises: determining that the preamble symbol exists in a position corresponding to a largest value calculated by multiplying all of output values of a correlator of the receiver that are delayed in length units of the sequences in the frame.

* * * * *